Jan. 3, 1956    J. P. RYNERSON, JR., ET AL    2,728,963
SHELL MOLDING MACHINE
Filed Sept. 25, 1953    4 Sheets-Sheet 1
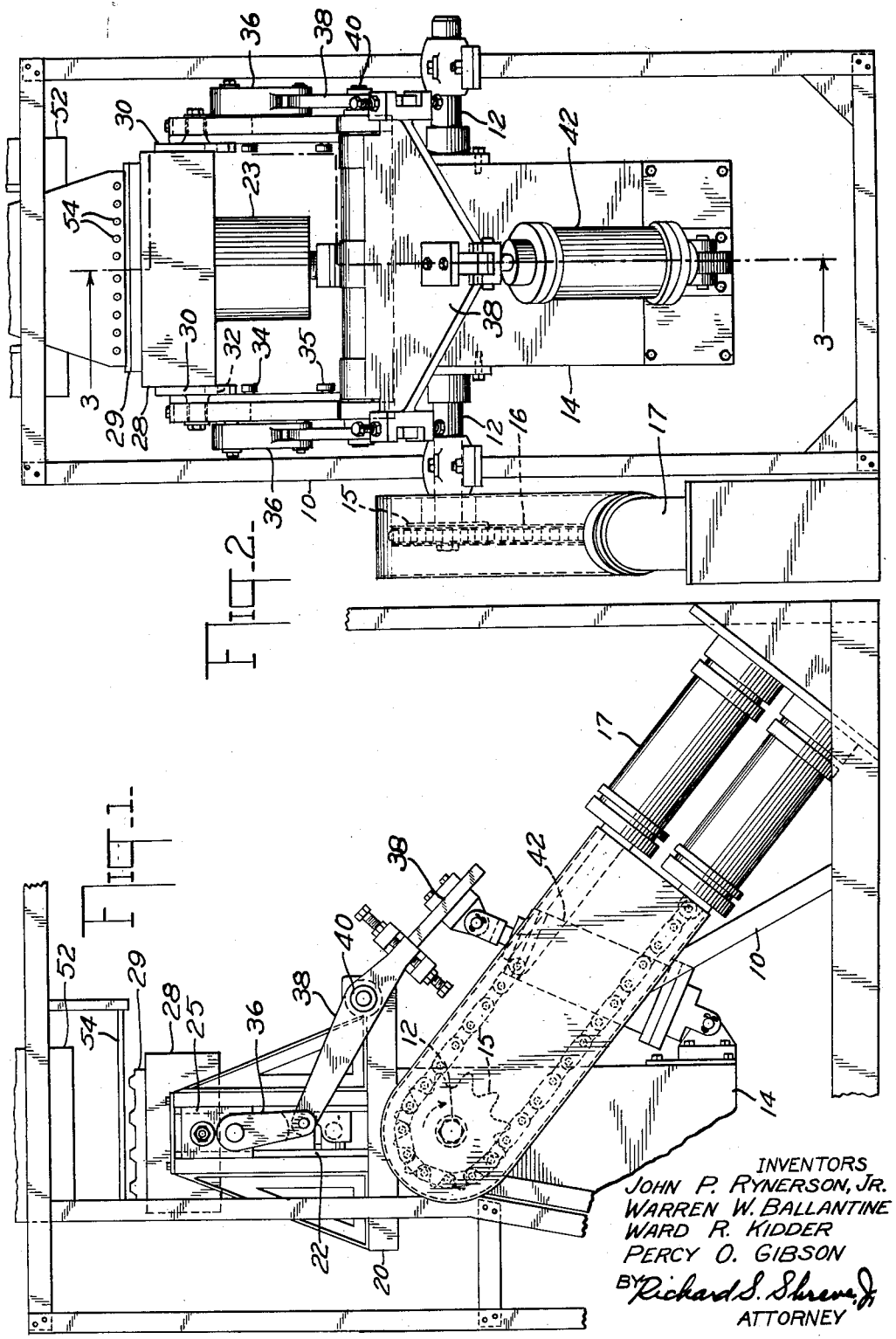
INVENTORS
JOHN P. RYNERSON, JR.
WARREN W. BALLANTINE
WARD R. KIDDER
PERCY O. GIBSON
BY Richard S. Shreve, Jr.
ATTORNEY

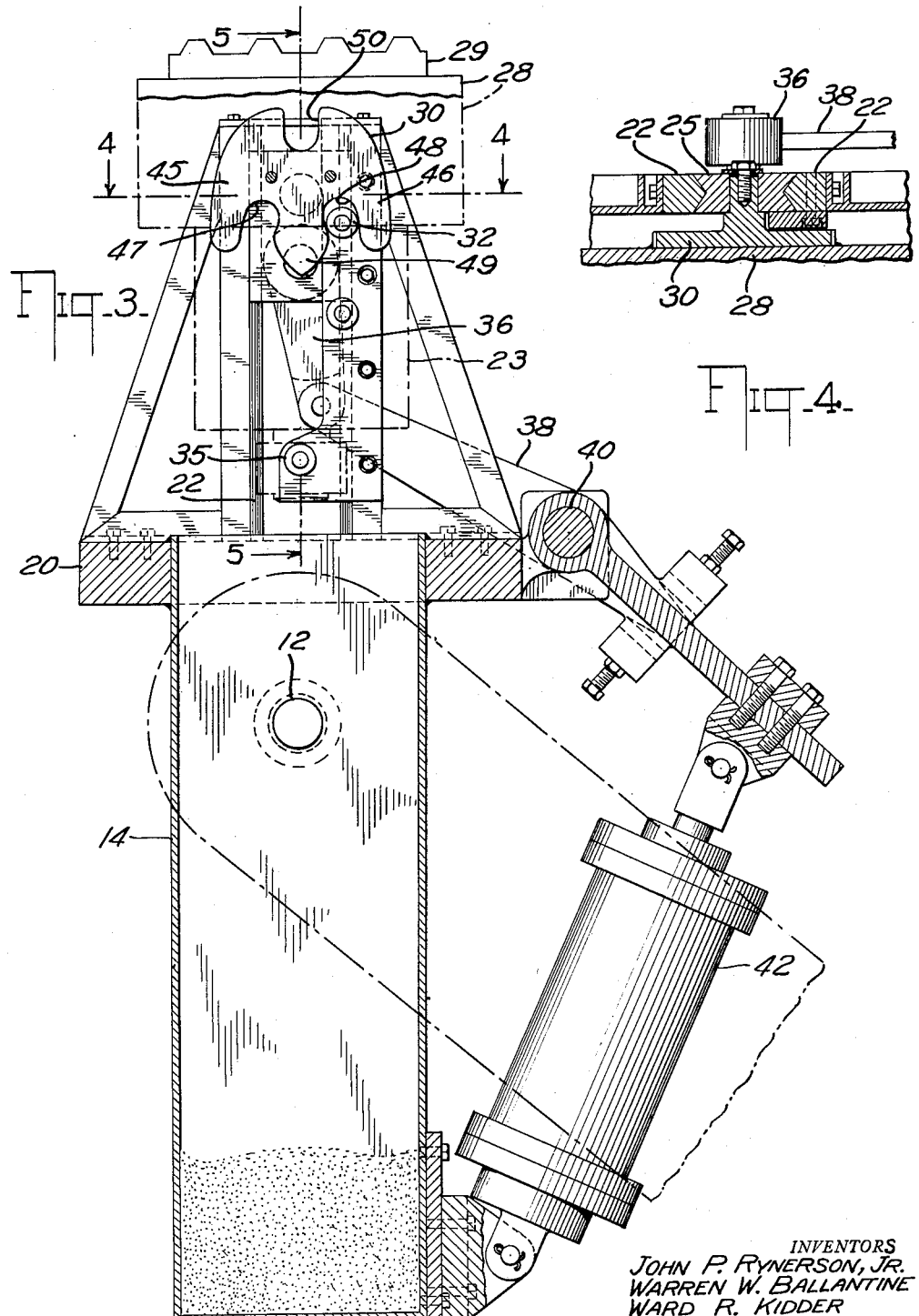

Jan. 3, 1956　　　J. P. RYNERSON, JR., ET AL　　　2,728,963
SHELL MOLDING MACHINE
Filed Sept. 25, 1953　　　　　　　　　　　　　　4 Sheets-Sheet 3
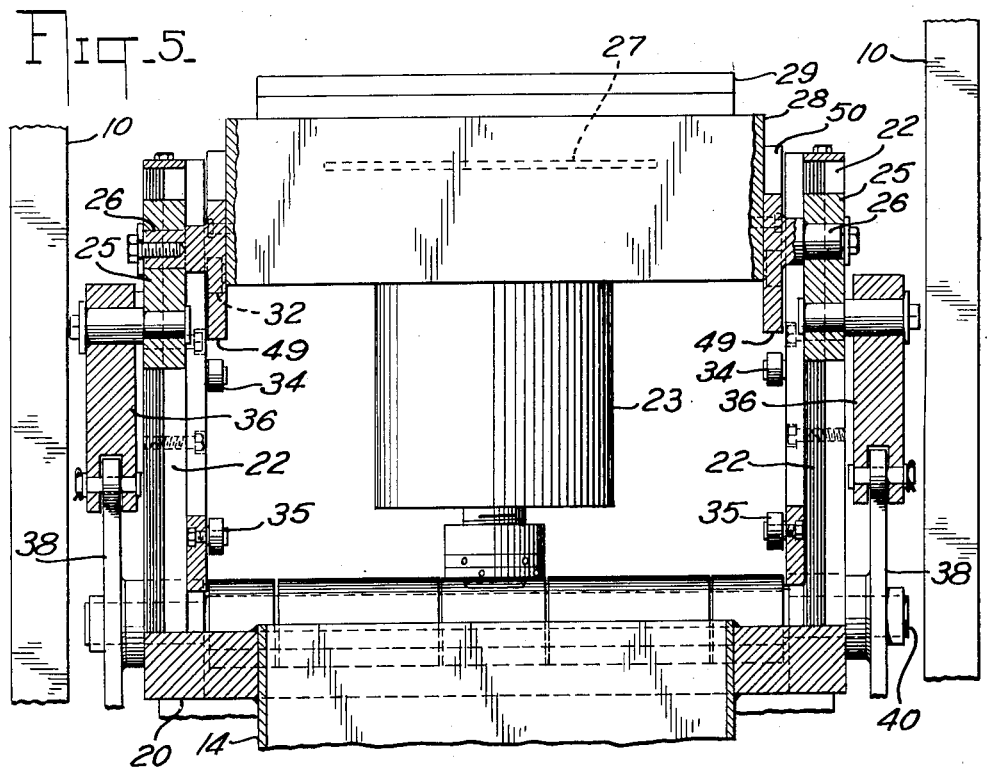
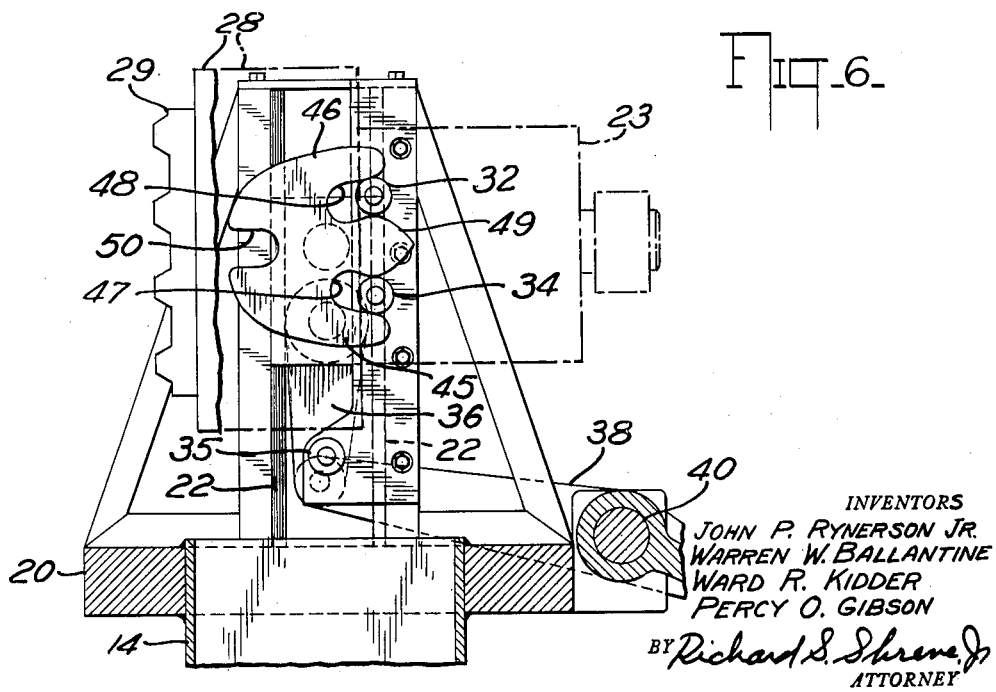
INVENTORS
JOHN P. RYNERSON JR.
WARREN W. BALLANTINE
WARD R. KIDDER
PERCY O. GIBSON
BY Richard S. Shreve Jr.
ATTORNEY

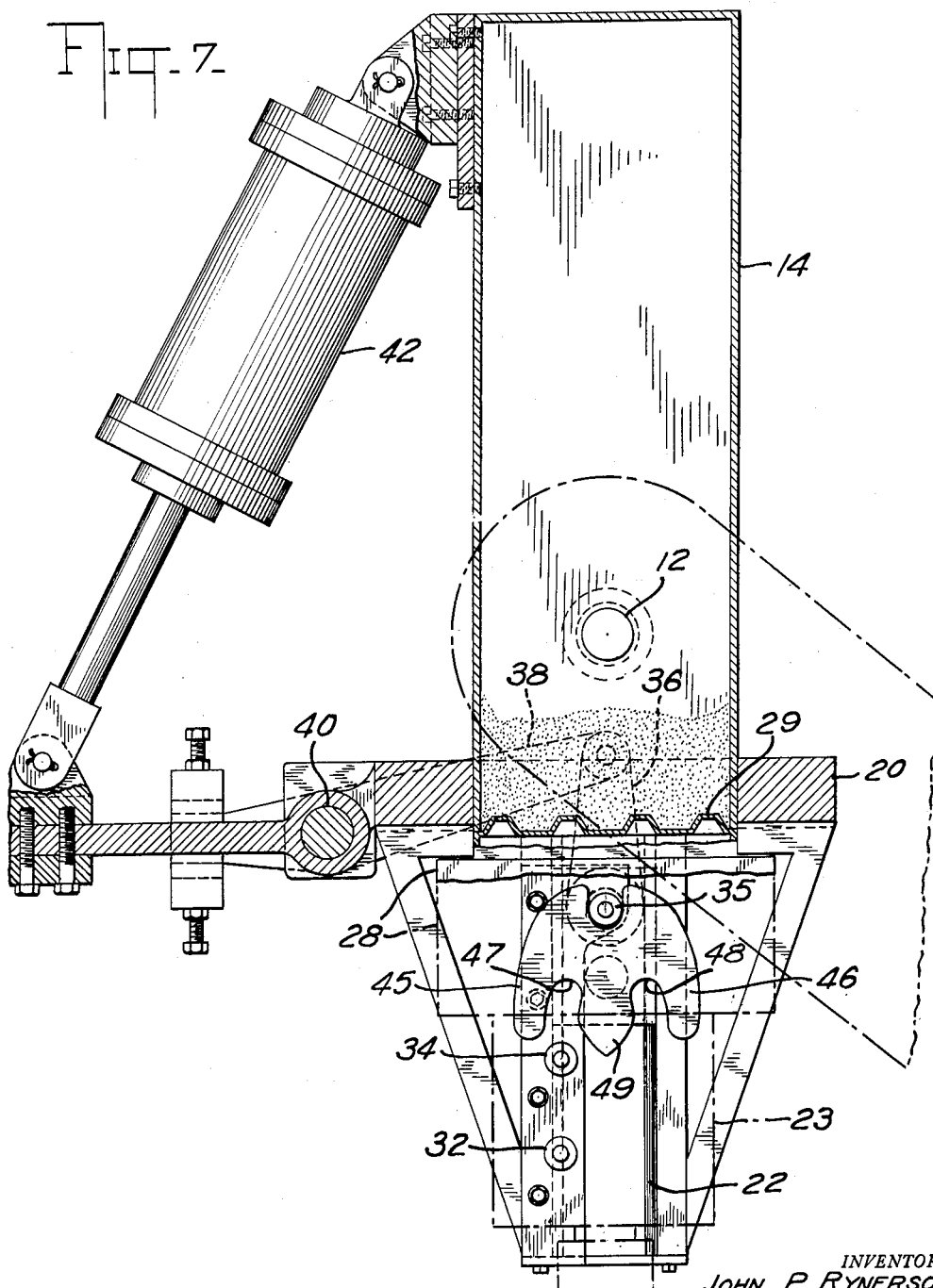

United States Patent Office 2,728,963
Patented Jan. 3, 1956

2,728,963
SHELL MOLDING MACHINE

John P. Rynerson, Jr., Warren W. Ballantine, Ward R. Kidder, and Percy O. Gibson, Kokomo, Ind., assignors to Union Carbide and Carbon Corporation, a corporation of New York Application September 25, 1953, Serial No. 382,378

9 Claims. (Cl. 22—9)

This invention relates to shell molding machines, and more particularly to machines for producing baked shell molds composed of sand and bonded by a thermal setting resin, and adapted to be assembled in mating pairs, placed in a box, and backed with steel shot or other supporting means for the thin mold parts so that they will withstand the pressure of the molten metal poured thereinto.

The main object of the present invention is to provide a rapid and automatic machine for producing such shell molds by a controlled mechanical process, to facilitate and expedite the manufacture thereof.

According to the present invention, a preheated metal pattern or match plate is placed over an open top dump box containing a premixed dry sand-resin mixture, the surface of the match plate on which the mold is formed being toward the sand-resin mixture in the dump box. The dump box is then quickly inverted through an arc of 180° allowing the sand-resin mixture to invest upon the hot pattern plate.

After a predetermined time lapse, the sand-resin dump box is then re-inverted to its original position, allowing all of the sand-resin mixture except the shell formed on the pattern by the thermal setting properties of the resin, to fall to the bottom of the dump box. The pattern plate is then raised straight upwards from the box so as not to dislodge the loosely retained invested shell from the pattern, inverted 180° and then subjected to a source of heat to bake and cure the shell. The cured shell is then removed from the pattern plate by means of ejector pins, the pattern plate reheated if necessary and the above cycle is repeated.

One of the important novel features of the present invention is the unique manner in which the pattern plate assembly is accurately guided into position on the dump box, held firmly in that position during inversion and return of the dump box to normal position, lifting of the pattern assembly from the dump box in a guided direction, and then inverting the pattern assembly 180° so that the formed shell mold is on top and in position to be baked by some form of radiant type heater. The pattern assembly may be made in such a manner that the newly formed mold with pattern may be placed on a conveyor to be cured in an oven while other pattern assemblies are going through the investment cycle. After baking of the mold is completed, the mold is raised from the pattern plate by ejector pins and removed from the assembly by means of fork type lifter fingers. The pattern assembly, kept at constant temperature by built-in electric resistance heaters, is then re-inverted 180° and lowered into position over the dump box for the next cycle.

In the drawings:

Fig. 1 is a side elevation of a shell molding machine according to the preferred embodiment of the present invention;

Fig. 2 is a front elevation of the machine shown in Fig. 1;

Fig. 3 is a vertical section taken along the line 3—3 of Fig. 2;

Fig. 4 is a horizontal section taken along the line 4—4 of Fig. 3;

Fig. 5 is a vertical section taken along the line 5—5 of Fig. 3;

Fig. 6 is a view of the parts at the tip of Fig. 3, shown in the half-way position; and Fig. 7 is a view of the parts in Fig. 3, shown in the completely inverted position of the dump box.

The machine shown in the drawings comprises a frame 10 in which is journaled a shaft 12 which carries a sand-resin dump box 14. The shaft 12 is rotated through a half revolution by means of a sprocket 15 over which passes a chain 16, the parallel ends of which are driven in opposite directions by cylinders 17.

Secured to the open top of the dump box 14 is a frame 20 having guideways 22 rigid therewith, in which are mounted slides 25. Trunnions 26 are journaled in these slides to rotatably support a pattern head 28, which carries a metal pattern or match plate 29, and is kept at constant temperature by built-in electrical resistance heaters 27. An air cylinder 23 mounted as part of the head 28 operates ejector pins to raise the mold from the pattern plate 29.

Rigidly mounted on each end of the pattern head 28 are cams 30, which cooperate with cam rollers 32 and 34 vertically spaced along the inside of the guideways 22, and a central roller 35 at the bottom thereof.

The slides 25 are each connected by links 36 to a lever 38 pivoted at 40 on the frame 20. The other end of the lever 38 is actuated by an air cylinder 42 pivoted on the side of the dump box 14.

The cams 30 each comprise symmetrical lobes 45 and 46 defining lower sockets 47 and 48 with a spear 49 therebetween, and an upper central socket 50 between the lobes.

At the top of the frame 10 is mounted a vertically movable baking oven 52 such as an open flame gas burner, which is adapted to be raised and lowered with respect to the shell on the pattern plate 29 in the position shown in Fig. 1, and a set of fork type shell lifter fingers 54 adapted to be moved horizontally with respect to the baked shell.

In operation of the machine, starting with the parts in the position shown in Fig. 3, the preheated metal pattern 29 being secured to the pattern head 28, the first step is to lower the patern head and simultaneously rotate it through an arc of 180° to register the pattern 29 with the open top of the dump box 14. For this purpose, air is admitted to the cylinder 42, pushing the lever 38 about its fulcrum 40 and pulling down on the links 36, which move the slides 25 down along the guideways 22.

As each slide descends the cam socket receives the upper cam roller 32 which resists the socket, causing the cam and pattern head to rotate about the descending trunnions 26. This causes the spear head 49 to swing below the cam roller 32 and above the cam roller 34, to the position shown in Fig. 6.

Further descent of the slide causes further rotation of the pattern head 28 because the lower cam roller 34 resists descent of the spear 49 until the pattern head has completed a half turn of 180°. This brings the center socket 50 into line with the center roller 35, and upon further descent of the slide 25, the parallel sides of the central socket 50 accurately guide the pattern head 28 to bring the metal pattern 29 into centered position registering with the open top of the dump box 14. Thus at the end of its stroke, the air cylinder 42 holds the pattern plate 29 tightly against the top of the dump box 14.

The next step is to swing the dump box 14, with the pattern head and its actuating mechanism carried thereby, bodily as a unit, through 180° about the axis of the shaft 12. This is done by the air cylinders 17 driving the chain 16 to turn the sprocket 15, which turns the shaft 12 and parts carried thereby. This brings the parts to the position shown in Fig. 7, in which the sand-resin mixture in the dump box 14 falls onto the pattern plate 29, allowing the sand-resin mixture to invest upon the hot pattern plate to form the shell.

It should be noted that the motion for lowering and inverting the pattern plate can be synchronized with the start of the rotation of the dump box in order to speed up the all-over cycle, instead of having to wait until the pattern is firmly seated on the dump box before the dump box can be rotated. It should also be noted that the air pressure on the cylinder 42 maintains firm seating of the pattern on the dump box all during the roll-over period of the dump box for investure of molding mixture on the pattern plate.

After a predetermined shell investment time lapse, the air cylinders 17 are actuated in the opposite direction, and the dump box 14 is reinverted to the original position, allowing all of the sand mixture, except the shell formed on the pattern plate 29 by the thermal setting properties of the resin, to fall to the bottom of the dump box.

During the reinversion of the dump box, as the dump box is nearing the end of its rotation to normal position, the cylinder 42 is actuated in the opposite direction, causing a reversal of the pattern assembly movement back through the 180° arc to the bake-off position. In this return to bake-off position, all-over time of the mold-making cycle can also be shortened because this action can be synchronized to start before counter rotation of the dump box has been completed.

In this return movement to bake-off position, the parallel sides of the socket 50 cause a straight line movement of the pattern plate away from the top of the dump box, so as not to dislodge the loosely retained shell therefrom.

The cam mechanism for rotating the pattern assembly is rugged, simple in construction, and provides very rapid and precise motion. The precise motion is especially necessary when lowering the pattern on to the dump box in order to obtain as near perfect alignment as possible, and avoid damage to expensive pattern equipment. Since the pattern assembly is an integral part of the sand box roll-over assembly, the start of the cam action can be synchronized to start operation during the end of the dump box rotation, thus providing faster mold production. The complete mechanical cycle, or actual total time in which mechanical action is taking place is under ten seconds whereas prior machines require as much as forty seconds. Another advantage is that only one source of power, such as hydraulic or air cylinder, is needed to actuate both the raising and lowering of the pattern assembly as well as rotating it through the 180° arc.

After the pattern head 28 is well clear of the top of the sand box, further upward movement of the slide 25 causes the cam socket 47 to receive the cam roller 34, which turns the cam and head 28 a return quadrant, causing the spear head 49 to ride under the cam roller 32. Further upward movement of the slide with the roller 32 bearing on the spear head 49, turns the cam and head 28 another quadrant, returning the pattern 29 to the top of its cycle.

In this position the newly-formed shell is resting on the top of the pattern 29, and the oven 52 is now lowered into position to bake the shell and cure the resin. Then the oven 52 is raised, and the ejector pins actuated by the air cylinder 23 raise the mold from the pattern 29. After the ejector pins have been retracted, the lifter fingers 54 are moved horizontally toward the pattern 29 to strip the baked shell therefrom. The lifter fingers are then returned carrying the baked shell thereon, leaving the pattern 29 clear for another cycle.

We claim:

1. In a shell molding machine, an open topped dump box, a heater mounted above said box, a pattern head carrying a pattern to register with the open top of said box and receive a shell invested thereon, means for mounting said pattern head and heater for relative movement, and means for simultaneously raising and rotating said pattern head to present said shell to said heater.

2. In a shell molding machine, an open topped dump box, a stripper mounted above said box, a pattern head carrying a pattern to register with the open top of said box and receive a shell invested thereon, means for mounting said pattern head and stripper for relative movement, and means for simultaneously raising and rotating said pattern head to present said shell to said stripper.

3. In a shell molding machine, an open topped dump box, guideways on said box extending above the top thereof, slides in said guideways, trunnions in said slides, a pattern head carried by said trunnions, means for moving said slides in said guideways, and cooperating means on said pattern head and said guides for rotating said pattern head during the reciprocation of said slides.

4. In a shell molding machine, an open topped dump box, guideways on said box extending above the top thereof, slides in said guideways, trunnions journaled in said slides, a pattern head carried by said trunnions, a cam rigid with said pattern head, cam rollers mounted on said guideways, and means for moving said slides in said guideways to reciprocate said trunnions, whereby said cam and rollers cooperate to rotate said pattern head as it is reciprocated by said trunnions.

5. In a shell molding machine, an open topped dump box adapted to receive a pattern and invest a shell thereon, a pattern head for carrying said pattern, means for mounting said pattern head and dump box for relative movement, means for moving said pattern head toward the open top of said box, a cam rigid with said head, rollers having journals mounted rigid with said box cooperating with said cam to rotate said pattern head a half revolution as it moves toward said open top, and means for causing a final straight line movement of said pattern head to register said pattern with the open top of said box.

6. In a shell molding machine, an open topped dump box adapted to receive a pattern and invest a shell thereon, a pattern head for carrying said pattern, means for mounting said pattern head above said dump box for relative movement, means for moving said pattern head toward said box to register the pattern with the open top thereof, a cam rigid with said head comprising a socket and a spear, journals mounted rigid with said box, an upper roller on one of said journals engaging said socket for rotating said pattern head through a first quadrant, and a lower roller on another of said journals engaging said spear for further rotating said pattern head through a second quadrant.

7. Shell molding machine as claimed in claim 1, in which said means for simultaneously raising and rotating said pattern head has an initial straight line motion to withdraw said pattern and invested shell away from said open top.

8. Shell molding machine as claimed in claim 2, in which said means for simultaneously raising and rotating said pattern head has an initial straight line motion to withdraw said pattern and invested shell away from said open top.

9. Shell molding machine as claimed in claim 3, in which said cooperating means produce an initial straight line motion to withdraw said pattern and invested shell away from said open top.

References Cited in the file of this patent

UNITED STATES PATENTS 2,659,944     Valyi _____ Nov. 24, 1953

FOREIGN PATENTS 832,936     Germany _____ Mar. 3, 1952